United States Patent
Zhang et al.

(10) Patent No.: US 9,344,669 B2
(45) Date of Patent: May 17, 2016

(54) HDMI SOURCE/SINK INTEROPERABLE CONFIGURATION DETERMINATION PROCESS

(75) Inventors: Yaxi Zhang, Wayne, PA (US); David B. Lazarus, Elkins Park, PA (US); John D. Ogden, Media, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/165,031

(22) Filed: Jun. 21, 2011

(65) Prior Publication Data

US 2012/0327250 A1    Dec. 27, 2012

(51) Int. Cl.
| G06F 13/00 | (2006.01) |
| H04N 5/765 | (2006.01) |
| G09G 5/00 | (2006.01) |
| H04N 21/4363 | (2011.01) |
| G09G 3/00 | (2006.01) |

(52) U.S. Cl.
CPC ............... *H04N 5/765* (2013.01); *G09G 5/006* (2013.01); *H04N 21/43635* (2013.01); *G09G 3/006* (2013.01); *G09G 2330/12* (2013.01); *G09G 2360/02* (2013.01); *G09G 2370/042* (2013.01); *G09G 2370/12* (2013.01)

(58) Field of Classification Search
CPC ..................... G09G 2370/12; H04N 21/43635
USPC ...................................... 710/11, 16; 345/520
See application file for complete search history.

(56) References Cited

U.S. PATENT DOCUMENTS

| 7,565,530 | B2 | 7/2009 | Kwak et al. |
| 7,729,618 | B2 | 6/2010 | Tatum et al. |
| 7,752,575 | B2 | 7/2010 | Anglin et al. |
| 7,755,653 | B2 | 7/2010 | Takamori |
| 7,818,466 | B2 | 10/2010 | Rainho Almeida et al. |
| 7,827,319 | B2 | 11/2010 | Kimura et al. |
| 7,889,678 | B2 | 2/2011 | Peterson |
| 7,908,405 | B2 | 3/2011 | Yung et al. |
| 7,936,401 | B2 | 5/2011 | Nakajima et al. |
| 2003/0016680 | A1 | 1/2003 | Stein et al. |

(Continued)

FOREIGN PATENT DOCUMENTS

KR    1020070057466 A    6/2007

OTHER PUBLICATIONS

PCT Search Report and Written Opinion, RE: Application # PCT/US2012/043522, Sep. 3, 2012.

(Continued)

*Primary Examiner* — Ernest Unelus
(74) *Attorney, Agent, or Firm* — Stewart M. Wiener

(57) ABSTRACT

A method and system that configures an HDMI source device to use initial output parameters for communicating with an HDMI sink device, detects an abnormal operation performed by the HDMI sink device, selects a test of the HDMI sink device, applies the test, evaluates a result to determine whether the test produces a desired result, and modifies the initial output parameters to create revised output parameters. When the test produces the desired result, the revised output parameters will enable the HDMI sink device to produce the desired result. When the test fails to produce the desired result, the revised output parameters are conservative parameters that fail to produce the abnormal operation. The method reconfigures the HDMI source device to use the revised output parameters for communicating with the HDMI sink device, and saves the revised output parameters.

18 Claims, 3 Drawing Sheets

(56) References Cited

U.S. PATENT DOCUMENTS

| | | |
|---|---|---|
| 2003/0206563 A1 | 11/2003 | Lazarus et al. |
| 2004/0213390 A1 | 10/2004 | Lazarus et al. |
| 2004/0234059 A1 | 11/2004 | Lazarus et al. |
| 2005/0030944 A1 | 2/2005 | Lazarus et al. |
| 2007/0186015 A1* | 8/2007 | Taft et al. .................. 710/16 |
| 2007/0222779 A1* | 9/2007 | Fastert et al. ............. 345/418 |
| 2007/0274689 A1 | 11/2007 | Stone |
| 2008/0158258 A1 | 7/2008 | Lazarus et al. |
| 2009/0027405 A1 | 1/2009 | Kaga |
| 2009/0033668 A1* | 2/2009 | Pederson et al. ........... 345/520 |
| 2009/0141897 A1 | 6/2009 | Lazarus et al. |
| 2009/0193490 A1 | 7/2009 | Stone et al. |
| 2010/0014671 A1 | 1/2010 | Moroney |
| 2010/0033627 A1* | 2/2010 | Hayashi et al. ............. 348/500 |

OTHER PUBLICATIONS

Notice of Preliminary Rejection, Korean Patent Application No. 10-2014-7001234, dated Mar. 17, 2015.

Official Action RE: Canadian Application No. 2,840,191, dated Jul. 8, 2015.

Official Action, RE: Korean Application No. 10/2014-7001234 (Foreign Text and English Translation) dated Oct. 29, 2015.

* cited by examiner

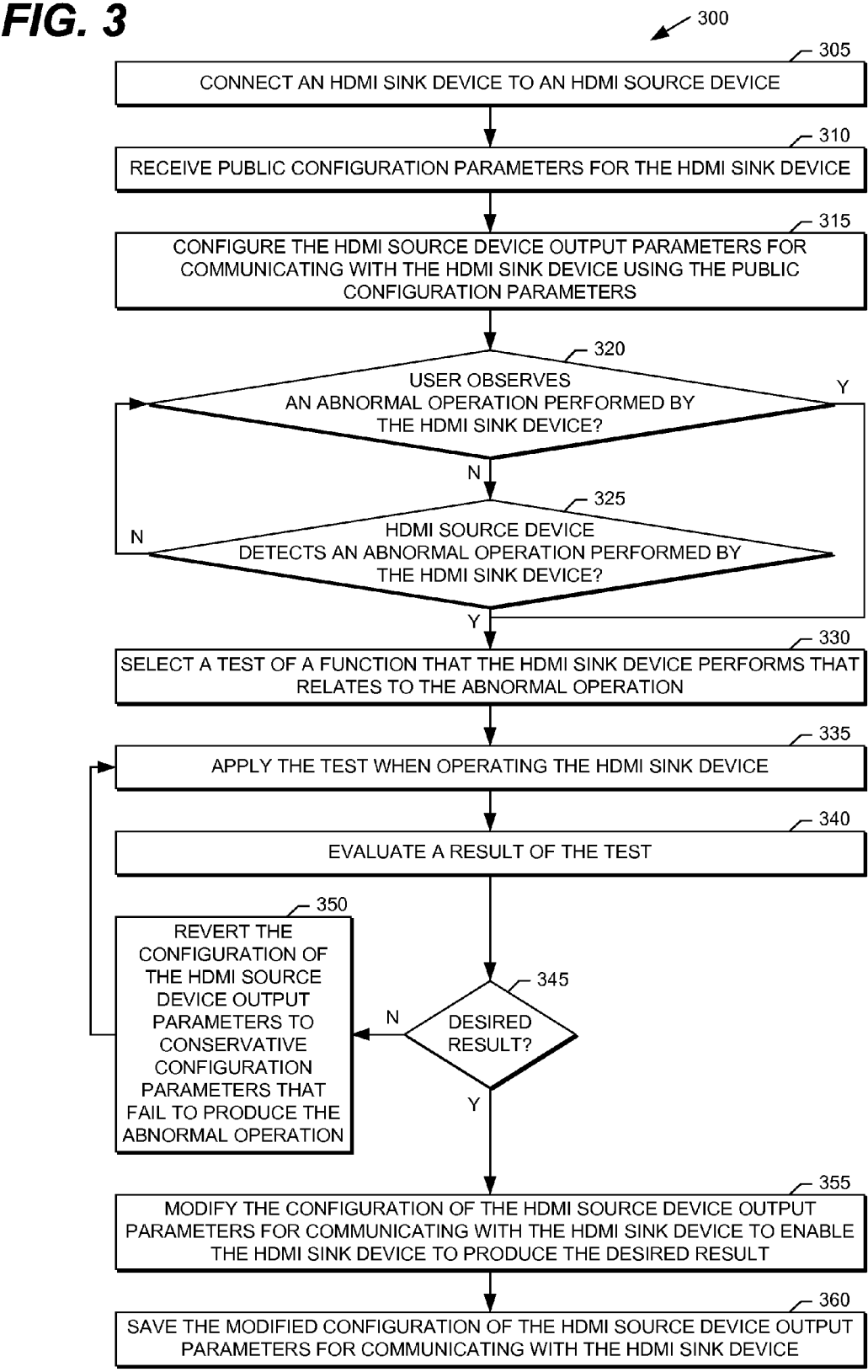

HDMI SOURCE/SINK INTEROPERABLE CONFIGURATION DETERMINATION PROCESS

BACKGROUND

High-Definition Multimedia Interface (HDMI) is a compact audio/video interface standard for transmitting and receiving uncompressed digital data. The HDMI standard enables the connection of a digital audio/video source (e.g., set-top box, Digital Video Disc (DVD) player, camcorder, personal computer, video game console, and audio/video receiver) to a compatible digital audio/video sink device (e.g., computer monitor, video projector, and digital television). The device that sends an HDMI signal (e.g., the DVD player or set-top box) is the HDMI source device, and the device that receives an HDMI signal (e.g., the digital television) is the HDMI sink device.

The HDMI specification describes three separate communications channels, Transition Minimized Differential Signaling (TMDS), Display Data Channel (DDC), and Consumer Electronics Control (CEC). The TMDS communications channel carries all audio and video data as well as auxiliary data that describes the active audio and video streams. An HDMI source device uses the DDC communications channel to determine the capabilities and characteristics of the HDMI sink device by reading the Enhanced Extended Display Identification Data (E-EDID) data structure. The HDMI source device reads the E-EDID from the HDMI sink device, and delivers only the audio and video formats that the HDMI sink device will support. In addition, the HDMI sink device detects and processes the received audio and video data appropriately. The CEC communications channel is optional, and provides support for higher-level user functions such as automatic setup tasks or tasks typically associated with infrared remote control usage.

Consumer electronics devices that support the HDMI standard can be automatically configured, self-correct errors, and free the consumer from managing the device. The goal of the HDMI standard is for these devices to be "plug-n-play" devices. Unfortunately, the plug-n-play process for HDMI devices has never worked smoothly. The HDMI source devices must interoperate with many types of HDMI sink devices and the presentation output has many possible formats in the HDMI standard. Interoperability problems arise largely due to the limited HDMI High-bandwidth Digital Content Protection (HDMI/HDCP) compliance test scope as specified by the HDMI/HDCP standard bodies. For example, the HDCP compliance test uses only the 480p output format. It is possible for some digital televisions to pass the compliance test using the 480p output format, but still exhibit interoperability problems on other formats such as the 480i output format. Furthermore, the HDMI compliance test does not involve any transition characterization, leaving room for a wide variety of transition behaviors during video presentation.

If there is a bug or flaw in the design of the HDMI sink device that results in poor behavior in some output formats, the automatically selected plug-n-play configuration will offer no work-around. For example, it is not possible for many digital television users to upgrade their television, even if a firmware fix is available. The cable and satellite system operators rely on the manufacturers of the set-top box to provide a work-around for all of the interoperability issues with firmware upgrades to the set-top box. The challenge is to provide a set-top firmware work-around for a specific model of television without affecting the operation—and previous work-around—for all other models of television. A perfect compromise solution is hard to achieve and deployment results in reduced presentation quality for all models of television. In addition, frequent changes to the firmware on the set-top box significantly increase the burden of testing the firmware release.

Another significant challenge is the constant appearance of new HDMI sink devices that have never been tested with the HDMI source device. An HDMI source device, such as a set-top box, is exposed to almost every new HDMI television sink device being manufactured. There is no way to avoid the inevitable interoperability issues that arise. When confronted with many consumer complaints, the cable and satellite system operators once again rely on the manufacturers of the set-top box to provide a work-around for all of the interoperability issues with firmware upgrades to the set-top box.

There is a need for an HDMI sink device interoperability evaluation process that determines the best configuration of HDMI source device output parameters for communicating with a particular HDMI sink device. After evaluating the HDMI sink device, the process saves the configuration for all future connections with the same HDMI sink device. This evaluation process will allow the HDMI source devices to optimize the output parameter settings for each HDMI sink device without requiring a compromise solution that affects other HDMI sink devices. The presently disclosed invention satisfies this demand.

SUMMARY

Aspects of the present invention provide a method and system that configures an HDMI source device to use initial output parameters for communicating with an HDMI sink device, detects an abnormal operation performed by the HDMI sink device, selects a test of the HDMI sink device, applies the test, evaluates a result to determine whether the test produces a desired result, and modifies the initial output parameters to create revised output parameters. When the test produces the desired result, the revised output parameters will enable the HDMI sink device to produce the desired result. When the test fails to produce the desired result, the revised output parameters are conservative parameters that fail to produce the abnormal operation. The method reconfigures the HDMI source device to use the revised output parameters for communicating with the HDMI sink device, and saves the revised output parameters.

BRIEF DESCRIPTION OF THE DRAWINGS

FIG. 3 is a flow diagram that illustrates a method according to one embodiment of the present invention.

DETAILED DESCRIPTION

Figure 1:
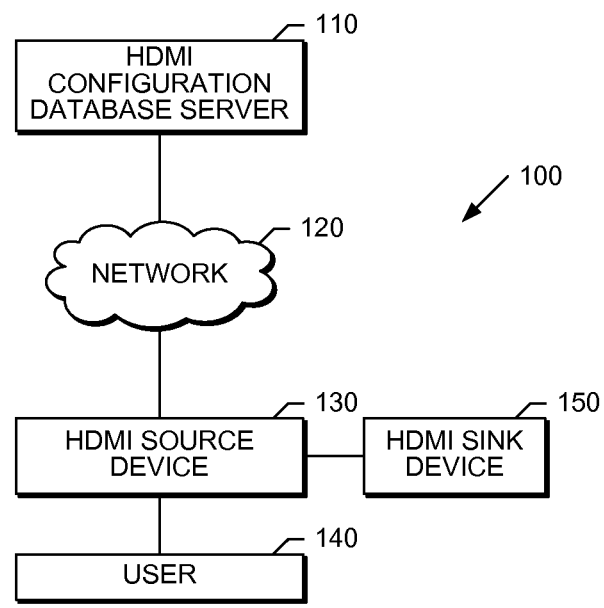
FIG. 1 is a network diagram that illustrates one embodiment of the hardware components of a system that performs the present invention.

FIG. 1 is a network diagram that illustrates one embodiment of the hardware components of a system that performs the present invention. The HDMI system 100 shown in FIG. 1 includes an HDMI configuration database server 110, network 120, HDMI source device 130, user 140, and HDMI sink device 150. The network 120 connects the HDMI configuration database server 110 to the HDMI source device 130. The HDMI sink device 150 connects to the HDMI source device 130. The user 140 operates the HDMI source device 130 and the HDMI sink device 150. The HDMI system 100 shown in FIG. 1 may include any number of interconnected HDMI configuration database servers 110, networks 120, HDMI source devices 130, users 140, and HDMI sink devices 150. In another embodiment, the functionality that the HDMI configuration database server 110 provides is integrated, either entirely or in-part, with the HDMI source device 130.

The network 120 shown in FIG. 1, in one embodiment, is a communication network. The present invention also contemplates the use of comparable network architectures including a LAN, a Personal Area Network (PAN) such as a Bluetooth network, a wireless LAN (e.g., a Wireless-Fidelity (Wi-Fi) network), and a Virtual Private Network (VPN). The system also contemplates network architectures and protocols such as Ethernet, Internet Protocol, and Transmission Control Protocol.

The user 140 operates the HDMI source device 130 shown in FIG. 1 to initiate a process on the HDMI source device 130 to evaluate the communication with the HDMI sink device 150 by determining the best (i.e., optimal, or most efficient) configuration of HDMI source device 130 output parameters for communicating with the HDMI sink device 150. In another embodiment, the HDMI source device 130 automatically initiates the evaluation process. In yet another embodiment, the HDMI source device 130 relies upon observations by the user 140 of the HDMI sink device 150 to provide feedback for determining the best configuration of the HDMI source device 130 output parameters for communicating with the HDMI sink device 150.

Figure 2:
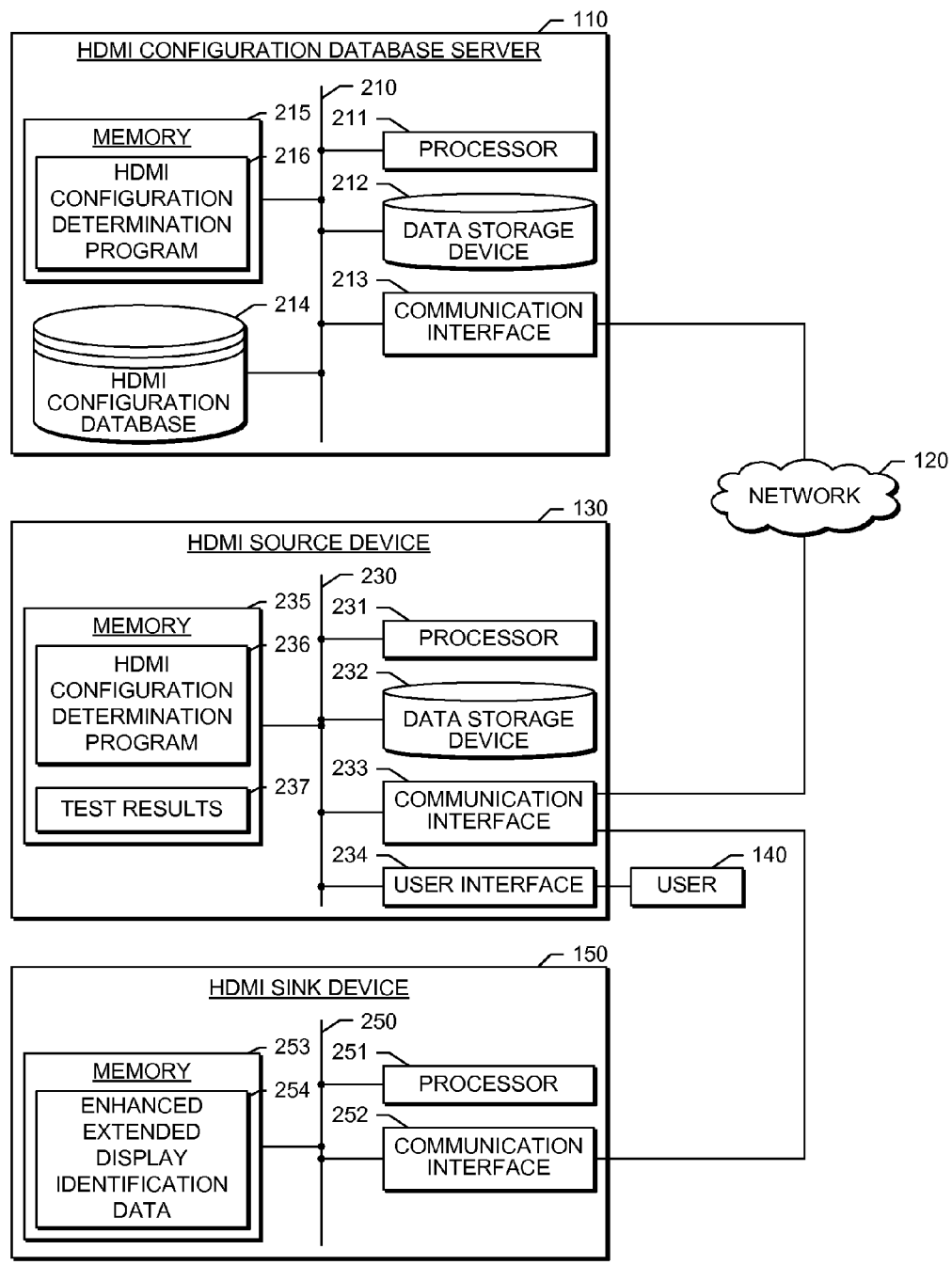
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the HDMI configuration database server 110, HDMI source device 130, and HDMI sink device 150 shown in FIG. 1.

The HDMI configuration database server 110, in one embodiment, is a general-purpose computing device that performs the present invention. A bus 210 is a communication medium that connects a processor 211, data storage device 212 (such as a Serial ATA (SATA) hard disk drive, optical drive, Small Computer System Interface (SCSI) disk, flash memory, cloud storage, or the like), communication interface 213, HDMI configuration database 214, and memory 215 (such as Random Access Memory (RAM), Dynamic RAM (DRAM), non-volatile computer memory, flash memory, or the like). The communication interface 213 connects the HDMI configuration database server 110 to the network 120, and allows the HDMI configuration database server 110 to provide device configuration parameters to enable an HDMI source device 130 to communicate with an HDMI sink device 150. The HDMI configuration database 214, in various embodiments, is a text file, relational database, or object database. In another embodiment, the HDMI configuration database 214 is distributed between the HDMI configuration database server 110 and HDMI source device 130. In yet another embodiment, the HDMI configuration database 214 resides entirely on the HDMI source device 130.

The processor 211 performs the disclosed methods by executing the sequences of operational instructions that comprise each computer program resident in, or operative on, the memory 215. The reader should understand that the memory 215 may include operating system, administrative, and database programs that support the programs disclosed in this application. In one embodiment, the configuration of the memory 215 of the HDMI configuration database server 110 includes an HDMI configuration determination program 216 that performs the methods of the present invention disclosed in detail in FIG. 3. When the processor 211 performs the disclosed methods, it stores intermediate results in the memory 215, data storage device 212, or HDMI configuration database 214. In another embodiment, the memory 215 may swap programs, or portions thereof, in and out of the memory 215 as needed, and thus may include fewer than all of these programs at any one time.

The HDMI source device 130, in one embodiment, is a general-purpose computing device that performs the present invention. A bus 230 is a communication medium that connects a processor 231, data storage device 232 (such as a Serial ATA (SATA) hard disk drive, optical drive, Small Computer System Interface (SCSI) disk, flash memory, or the like), communication interface 233, user interface 234, and memory 235 (such as Random Access Memory (RAM), Dynamic RAM (DRAM), non-volatile computer memory, flash memory, cloud storage, or the like). The communication interface 233 connects the HDMI source device 130 to the network 120, and allows the HDMI source device 130 to receive from the HDMI configuration database server 110 device output parameters for an HDMI sink device 150 that connects to the HDMI source device 130. The user interface 234 connects the user 140 to the HDMI source device 130. In one embodiment, the user interface 234 is an infrared remote control that enables the user 140 to access an on-screen menu displayed on an HDMI television that is an HDMI sink device 150 that connects to the HDMI source device 130. In another embodiment, the user interface 234 is a keypad or keyboard that enables the user 140 to interact with the HDMI source device 130. In one embodiment, the implementation of the present invention on the HDMI source device 130 is an application-specific integrated circuit (ASIC).

The processor 231 performs the disclosed methods by executing the sequences of operational instructions that comprise each computer program resident in, or operative on, the memory 235. The reader should understand that the memory 235 may include operating system, administrative, and database programs that support the programs disclosed in this application. In one embodiment, the configuration of the memory 235 of the HDMI source device 130 includes an HDMI configuration determination program 236 that performs the methods of the present invention disclosed in detail in FIG. 3, and test results 237. When the processor 231 performs the disclosed methods, it stores intermediate results in the memory 235 or data storage device 232. In another embodiment, the memory 235 may swap programs, or portions thereof, in and out of the memory 235 as needed, and thus may include fewer than all of these programs at any one time.

The HDMI sink device 150, in one embodiment, is a general-purpose computing device that performs the present invention. A bus 250 is a communication medium that connects a processor 251, communication interface 252, and memory 253 (such as Random Access Memory (RAM), Dynamic RAM (DRAM), non-volatile computer memory, flash memory, or the like). The communication interface 252 connects the HDMI sink device 150 to the HDMI source device 130. In one embodiment, the implementation of the present invention on the HDMI sink device 150 is an application-specific integrated circuit (ASIC).

The processor 251 executes sequences of operational instructions that comprise each computer program resident in, or operative on, the memory 253. In one embodiment, the configuration of the memory 253 of the HDMI sink device 150 includes Enhanced Extended Display Identification Data (E-EDID) 254 that the HDMI source device 130 reads to determine the capabilities and characteristics of the HDMI sink device 150 to support the process disclosed in detail in FIG. 3. In one embodiment, the memory 253 is non-volatile memory. When the processor 251 executes sequences of operational instructions, it stores intermediate results in the memory 253. In another embodiment, the memory 253 may swap programs, or portions thereof, in and out of the memory 253 as needed, and thus may include fewer than all of these programs at any one time.

FIG. 3 is a flow diagram that illustrates a method according to one embodiment of the present invention. In particular, FIG. 3 illustrates the communication between the HDMI source device 130, and HDMI sink device 150.

The process 300 shown in FIG. 3, with reference to FIG. 1 and FIG. 2, begins when a user 140 connects an HDMI sink device 150 to an HDMI source device 130 (step 305). In one embodiment, the HDMI source device 130 is a set-top box, the HDMI sink device 150 is an HDMI television, and the connection uses standard HDMI cables. If the HDMI source device 130 and the HDMI sink device 150 are fully compliant with the HDMI/HDCP specification, the connection of the devices triggers the HDMI source device 130 to receive public configuration parameters for the HDMI sink device 150 (step 310). The public configuration parameters, including EDID, Bcaps register, and Bstatus, are used to create a full working configuration derived from the HDMI/HDCP specification for the HDMI sink device 150. The HDMI source device 130 uses the public configuration parameters to configure the HDMI source device 130 output parameters for communicating with the HDMI sink device 150 (step 315). This configuration of the communication includes, without limitation, the video output format (e.g., 480p, 480i, 1080p, and 1080i), audio output format (e.g., AC-3, AAC, and MPEG-2), preferred 3D video output format, DDC line communication delay, hold time, etc., and whether TMDS lines are turned off during format changes.

The process 300 shown in FIG. 3 begins to characterize an abnormal operation or problem with the initial configuration of the HDMI source device 130 output parameters for communicating between the HDMI source device 130 and the HDMI sink device 150 by either the user 140 observing an abnormal operation performed by the HDMI sink device 150 (step 320), or the HDMI source device 130 detecting an abnormal operation performed by the HDMI sink device 150 (step 325). If the user 140 observes the abnormal operation performed by the HDMI sink device 150 (step 320, Y branch), the user 140 may manually initiate a process to evaluate the observed abnormal operation and determine whether a modification to the configuration of the HDMI source device 130 output parameters for communicating with the HDMI sink device 150 will remedy the observed abnormal operation. Alternatively, if the HDMI source device 130 detects the abnormal operation (e.g., HDCP maintenance failure) performed by the HDMI sink device 150 (step 325, Y branch), the HDMI source device 130 automatically initiates the process to evaluate the abnormal operation and determine whether a modification to the configuration of the HDMI source device 130 output parameters for communicating with the HDMI sink device 150 will correct the abnormal operation.

The process to evaluate the abnormal operation and determine whether a modification to the configuration of the HDMI source device 130 output parameters for communicating with the HDMI sink device 150 will correct the abnormal operation begins when the process 300 shown in FIG. 3 selects a test that will evaluate the abnormal operation (step 330). In one embodiment, the test is of a function that the HDMI sink device 150 performs that relates to correction of the abnormal operation. In another embodiment, the test is based on typical working modes and conditions to determine whether the HDMI sink device 150 can perform well using the basic plug-n-play configuration. Once the process 300 selects the test (step 330), it applies the test when operating the HDMI sink device 150 (step 335), and evaluates a result of the test (step 340). After each test, the HDMI source device 130 determines whether a desired result was observed (step 345). In one embodiment, the evaluation of the result includes a comparison of the HDMI sink device 150 health status collected by the HDMI source device 130 to the desired result, where a "good" health status indicates that a device is working properly—without error—and is "healthy". The HDMI source device 130 may request the user 140 to set certain modes manually on the HDMI sink device 150 via an on-screen display. In addition, feedback from the user 140 may be needed to identify visual and audio artifacts, such as whether the video is presented on the HDMI sink device 150 with a particular resolution, or whether any video artifacts are present. After performing the test, the HDMI source device 130 stores the test results 237 in the memory 235, or data storage device 232. If the test did not obtain the desired result (step 345, N branch), the process 300 reverts the configuration of the HDMI source device 130 output parameters for communicating with the HDMI sink device 150 to conservative configuration parameters that fail to produce the abnormal operation (step 350), and reapplies the test (step 335) to determine whether the conservative configuration of the HDMI source device 130 output parameters for communicating with the HDMI sink device 150 do not produce the abnormal operation. If the test obtains the desired result (step 345, Y branch), the process 300 modifies the configuration of the HDMI source device 130 output parameters for communicating with the HDMI sink device 150 to enable the HDMI sink device 150 to produce the desired result (step 355), and saves the modified configuration of the HDMI source device 130 output parameters for communicating with the HDMI sink device 150. The process 300 iteratively applies tests at gradually reduced levels until the user 140 observes the desired result. In one embodiment, the HDMI source device 130 saves the modified configuration of the HDMI source device 130 output parameters for communicating with the HDMI sink device 150 in the HDMI configuration database 214 on the HDMI configuration database server 110, thereby allowing another HDMI source device 130 to retrieve the modified configuration of the HDMI source device 130 output parameters for communicating with the HDMI sink device 150. In one embodiment, the modified configuration of the HDMI source device 130 output parameters for communicating between the HDMI source device 130 and the HDMI sink device 150 replaces the public configuration of the HDMI source device 130 output parameters for communicating with the HDMI sink device 150 that the HDMI source device 130 will receive in the future (step 310).

In one embodiment, the HDMI source device 130 stores a log of problems encountered with the HDMI sink device 150, the results of the process to modify the configuration of the HDMI source device 130 output parameters for communicating with the HDMI sink device 150, and the actions by the user 140. In another embodiment, the HDMI source device 130 generates a detailed diagnostic report using a diagnostic interface to diagnose operations issues and to evaluate tests of the configuration of the HDMI source device 130 output parameters for communicating with the HDMI sink device 150.

The process 300 shown in FIG. 3 uses the simplest test-set to determine the optimal configuration of the HDMI source device 130 output parameters for communicating from the HDMI source device 130 to the HDMI sink device 150. If a test within a particular test category fails, then the configuration of the HDMI source device 130 output parameters for communicating with the HDMI sink device 150 for that category will generally revert to the most conservative configuration parameters as set by the HDMI/HDCP specification. The interoperable configuration of the communication with the HDMI sink device 150 may have a number of levels, from conservative configurations to increasingly more specialized configurations. In one embodiment, the interoperable configuration of the HDMI source device 130 output parameters for communicating with the HDMI sink device 150 includes two levels, full configuration and conservative configuration. The conservative configuration may include: (1) advanced feature support reduction; (2) conservative state transition timing (e.g., longer Hot Plug Detect (HPD) debounce time, or longer delay for the pixel clock to stabilize before starting the first part of HDCP authentication); (3) completely disconnect the TMDS signal to force the HDMI sink device 150 to synchronize; and (4) wait a predetermined amount of time, or use alternative I2C register, if the HDMI sink device 150 has a problem honoring the register status read method. For example, if the HDMI sink device 150 is an HDMI television that claims to support HDMI 1.1 features, but the user 140 observes snow when the HDMI source device 130 asserts the same information at the Ainfo register, then the HDMI source device 130 needs to revert the HDCP configuration for the HDMI television to not supporting the 1.1 features, and recommend to use all safe HDCP parameters for the HDMI television.

In one embodiment, the process 300 shown in FIG. 3 may perform the HDMI sink device 150 Hot Plug Detect (HPD) line stability test. The HDMI source device 130 firmware sends a request to the user 140 via an on-screen display to power off the HDMI sink device 150 (e.g., an HDMI television) and counts the number of HPD line transitions (i.e., interrupts) during the test period. If the number of HPD line transitions is greater than one, then there is noise in the HPD line and the HDMI source device 130 will apply the special power-on procedure to target this issue to prevent start-up presentation artifacts. Similarly, during the TV power-on period multiple HPD line transitions imply that the HPD line is not well controlled by the TV during its start-up processing. Special handling is also needed on the HDMI source device side.

In another embodiment, the process 300 shown in FIG. 3 may perform the HDMI sink device 150 audio format change artifact prevention test. The HDMI source device 130 firmware plays audio clips with different formats (e.g., AC-3, AAC, and MPEG-2) and requests an observation from the user 140 whether any artifacts were heard during the presentation period. If the user 140 responds that they observed an abnormality during the presentation, then the HDMI source device 130 will apply a special audio format change procedure.

In another embodiment, the process 300 shown in FIG. 3 may perform the HDMI sink device 150 video format change presentation quality test. The HDMI source device 130 firmware plays video clips with different formats (e.g., 480i, 720p, 1080p, and 1080i) and requests an observation from the user 140 whether any artifacts were seen during the presentation period. If the user 140 responds that they observed an abnormality during the presentation, then the HDMI source device 130 will apply a special video format change procedure.

For expert users or service technicians, the HDMI source device 130 may show the configuration of the HDMI source device 130 output parameters for communicating with the HDMI sink device 150 on an on-screen display to allow the user 140 to make manual selection of various combinations of configuration. This manual input feature provides additional flexibility to alleviate unanticipated field issues. This feature also makes it possible to configure the HDMI sink device 150 from a remote location via a designated downstream control channel. The HDMI source device 130 firmware can be programmed to execute the HDMI/HDCP protocols based on a set of rules that define a configuration that may be pushed to the HDMI source device 130, or downloaded by the HDMI source device 130, via the designated downstream control channel. Similarly, the data records that the HDMI source device 130 stores may also be retrieved via the upstream return channel.

The HDMI source device 130 may be controlled and configured from a remote location. Typically, a set-top box manufacturer or service provider has support facilities with support staff and network equipment. The purpose of these facilities is to answer calls from customers who need help and to configure the set-top boxes to eliminate customer problems. These problems can be addressed by either a staff member manually testing the customer's equipment, or automatic configuration of the setup.

At a customer support facility, support staff can conduct the same tests as mentioned above. There are many ways to implement remote test and configuration (e.g., telnet). The support staff would sit in front of a console and command the set-top box to conduct experiments. The results could be displayed on the support staff's console. Once the problem is understood, a configuration message can be sent to the setup to fix the problem. Once the problem is both understood and corrected, the automatic correction system is updated to automatically make this correction in the future.

An HDMI configuration database server 110 that is located at a support facility can support automatic configuration by maintaining a database of the recommended configuration of the HDMI source device 130 output parameters for communicating with each model of HDMI sink device 150 (e.g., an HDMI television). Whenever the set-top box needs to know the configuration of the HDMI source device 130 output parameters for communicating from the HDMI source device 130 to the HDMI sink device 150, it sends a query to the HDMI configuration database server 110. Whenever a recommended configuration changes, the configuration change is broadcast to all set-top boxes. If a set-top box is connected to an HDMI sink device 150 that has had a recommended configuration change, the set-top box will update the configuration of the HDMI source device 130 output parameters for communicating with the HDMI sink device 150. When an HDMI sink device 150 is connected to the set-top box, the set-top box sends a query to the HDMI sink device 150 to request its EDID that lists the capabilities of the HDMI sink device 150. The EDID response contains sufficient information to identify the specific device. The set-top box then sends this identity to the HDMI configuration database server 110 and the HDMI configuration database server 110 returns a recommended configuration of the HDMI source device 130 output parameters for communicating with the HDMI sink device 150.

For example, if the configuration of the HDMI source device 130 output parameters for communicating from an HDMI source device 130 to an HDMI sink device 150 (e.g., an HDMI television) incorrectly lists a preferred 3D format that its EDID does not support, when a customer tries to tune to a 3D channel, the results are bad. The customer calls the support center and speaks with a staff member. The staff member asks the customer a few questions and runs some remote tests. The support staff person diagnoses the problem, builds a special message to change the preferred 3D format in the configuration of the HDMI source device 130 output parameters for communicating with the HDMI sink device 150, and sends the message to the customer's HDMI source device 130 (e.g., set-top box). If the HDMI sink device 150 can now tune to a 3D channel, the customer is happy. The support staff adds the new configuration recommendation for this HDMI sink device 150 to the HDMI configuration database 214.

Although the disclosed embodiments describe a fully functioning method and system for configuration of the HDMI source device output parameters for communicating from an HDMI source device to an HDMI sink device, the reader should understand that other equivalent embodiments exist. Since numerous modifications and variations will occur to those reviewing this disclosure, the method and system for configuration of the HDMI source device output parameters for communicating from an HDMI source device to an HDMI sink device is not limited to the exact construction and operation illustrated and disclosed. Accordingly, this disclosure intends all suitable modifications and equivalents to fall within the scope of the claims.

We claim:

1. A method, comprising:
configuring a High Definition Multimedia Interface (HDMI) source device to use initial output parameters for communicating with an HDMI sink device;
in the HDMI source device, detecting an abnormal operation performed by the HDMI sink device;
in the HDMI source device, selecting a test of the HDMI sink device, wherein the test is of a function that the HDMI sink device performs and that relates to correction of the abnormal operation;
in the HDMI source device, applying the test when communicating with the HDMI sink device;
in the HDMI source device, evaluating a result of the test to determine whether the test produces a desired result;
in the HDMI source device, modifying the initial output parameters to create revised output parameters, wherein when the test produces the desired result, the revised output parameters will enable the HDMI sink device to produce the desired result, and wherein when the test fails to produce the desired result, the revised output parameters are conservative parameters that fail to produce the abnormal operation;
in the HDMI source device, reconfiguring the HDMI source device to use the revised output parameters for communicating with the HDMI sink device; and
in the HDMI source device, saving the revised output parameters, wherein the saving of the revised output parameters further comprises storing the revised output parameters in an HDMI configuration database, thereby allowing configuration of another HDMI source device to use the revised output parameters for communicating with the HDMI sink device.

2. The method of claim 1, wherein the configuring of the HDMI source device further comprises:
receiving public output parameters from the HDMI sink device; and
determining the initial output parameters based on the public output parameters.

3. The method of claim 1, wherein the detecting of the abnormal operation further comprises:
receiving a notification from a user of the HDMI sink device that the HDMI sink device performed the abnormal operation.

4. The method of claim 1, wherein the detecting of the abnormal operation further comprises:
automatically recognizing an error condition produced by the HDMI sink device.

5. The method of claim 1, wherein the evaluating of the result further comprises:
receiving the result as an observation from a user of the HDMI sink device;
evaluating the observation from the user; and
comparing the observation from the user to the desired result.

6. The method of claim 1, wherein the evaluating of the result further comprises:
receiving the result from the HDMI sink device as a health status collected by the HDMI source device;
evaluating the health status; and
comparing the health status to the desired result.

7. A system, comprising:
a memory device resident in a computing device; and
a processor of a High Definition Multimedia Interface (HDMI) source device disposed in communication with the memory device, the processor configured to:
in the HDMI source device, configure the HDMI source device to use initial output parameters for communicating with an HDMI sink device;
in the HDMI source device, detect an abnormal operation performed by the HDMI sink device;
in the HDMI source device, select a test of the HDMI sink device, wherein the test is of a function that the HDMI sink device performs and that relates to correction of the abnormal operation;
in the HDMI source device, apply the test when communicating with the HDMI sink device;
in the HDMI source device, evaluate a result of the test to determine whether the test produces a desired result;
in the HDMI source device, modify the initial output parameters to create revised output parameters, wherein when the test produces the desired result, the revised output parameters will enable the HDMI sink device to produce the desired result, and wherein when the test fails to produce the desired result, the revised output parameters are conservative parameters that fail to produce the abnormal operation;
in the HDMI source device, reconfigure the HDMI source device to use the revised output parameters for communicating with the HDMI sink device; and
in the HDMI source device, save the revised output parameters, wherein the saving of the revised output parameters further comprises storing the revised output parameters in an HDMI configuration database, thereby allowing configuration of another HDMI source device to use the revised output parameters for communicating with the HDMI sink device.

8. The system of claim 7, wherein to configure the HDMI source device, the processor is further configured to:
receive public output parameters for the HDMI sink device; and
determine the initial output parameters based on the public output parameters.

9. The system of claim 7, wherein to detect the abnormal operation, the processor is further configured to:
receive a notification from a user of the HDMI sink device that the HDMI sink device performed the abnormal operation.

10. The system of claim 7, wherein to detect the abnormal operation, the processor is further configured to:
automatically recognize an error condition produced by the HDMI sink device.

11. The system of claim 7, wherein to evaluate the result, the processor is further configured to:
receive the result as an observation from a user of the HDMI sink device;
evaluate the observation from the user; and
compare the observation from the user to the desired result.

12. The system of claim 7, wherein to evaluate the result, the processor is further configured to:
receive the result from the HDMI sink device as a health status collected by the HDMI source device;
evaluate the health status; and
compare the health status to the desired result.

13. A non-transitory computer-readable medium, comprising stored computer-executable instructions that, when executed on a computing device, perform steps of:
configuring a High Definition Multimedia Interface (HDMI) source device to use initial output parameters for communicating with an HDMI sink device;
detecting an abnormal operation performed by the HDMI sink device;
selecting a test of the HDMI sink device, wherein the test is of a function that the HDMI sink device performs and that relates to correction of the abnormal operation;
applying the test when communicating with the HDMI sink device;
evaluating a result of the test to determine whether the test produces a desired result;
modifying the initial output parameters to create revised output parameters, wherein when the test produces the desired result, the revised output parameters will enable the HDMI sink device to produce the desired result, and wherein when the test fails to produce the desired result, the revised output parameters are conservative parameters that fail to produce the abnormal operation;
reconfiguring the HDMI source device to use the revised output parameters for communicating with the HDMI sink device; and
in the HDMI source device, saving the revised output parameters, wherein the saving of the revised output parameters further comprises storing the revised output parameters in an HDMI configuration database, thereby allowing configuration of another HDMI source device to use the revised output parameters for communicating with the HDMI sink device.

14. The non-transitory computer-readable medium of claim 13, wherein the configuring of the HDMI source device further comprises:
receiving public output parameters from the HDMI sink device; and
determining the initial output parameters based on the public output parameters.

15. The non-transitory computer-readable medium of claim 13, wherein the detecting of the abnormal operation further comprises:
receiving a notification from a user of the HDMI sink device that the HDMI sink device performed the abnormal operation.

16. The non-transitory computer-readable medium of claim 13, wherein the detecting of the abnormal operation further comprises:
automatically recognizing an error condition produced by the HDMI sink device.

17. The non-transitory computer-readable medium of claim 13, wherein the evaluating of the result further comprises:
receiving the result as an observation from a user of the HDMI sink device;
evaluating the observation from the user; and
comparing the observation from the user to the desired result.

18. The non-transitory computer-readable medium of claim 13, wherein the evaluating of the result further comprises:
receiving the result from the HDMI sink device as a health status collected by the HDMI source device;
evaluating the health status; and
comparing the health status to the desired result.

* * * * *